United States Patent [19]

Fillios

[11] 4,409,958

[45] Oct. 18, 1983

[54] WATER HEATING METHOD AND APPARATUS

[76] Inventor: Jean-Pierre R. Fillios, 49, rue Péreire, 78100 Saint Germain-en-Laye, Paris, France

[21] Appl. No.: 289,376

[22] Filed: Aug. 3, 1981

[30] Foreign Application Priority Data

Aug. 8, 1980 [FR] France .................................. 80 17623

[51] Int. Cl.³ .................................................. F24J 3/02
[52] U.S. Cl. ..................................... 126/362; 122/4 A
[58] Field of Search ............... 126/362, 400, 423, 435, 126/437; 122/4 A, 13 A; 137/590; 236/100, 93 R

[56] References Cited

U.S. PATENT DOCUMENTS

| 1,802,326 | 4/1931 | Brooks ................................ 137/590 |
| 2,012,101 | 8/1935 | Hynes ................................ 219/312 |
| 3,212,337 | 10/1965 | McCarrick ........................ 236/100 |
| 3,241,760 | 3/1966 | Bailey ................................ 236/100 |
| 3,300,134 | 1/1967 | Wahler .............................. 236/100 |
| 3,893,618 | 7/1975 | Wong et al. ....................... 236/100 |
| 4,055,298 | 10/1977 | Wilson ............................. 226/100 |
| 4,164,322 | 8/1979 | Wong et al. ....................... 236/100 |

FOREIGN PATENT DOCUMENTS

| 6210 | 1/1980 | European Pat. Off. ........... 126/427 |
| 2542348 | 3/1977 | Fed. Rep. of Germany ...... 126/437 |
| 2398267 | 3/1979 | France ................................ 126/437 |
| 2402841 | 4/1979 | France ................................ 126/362 |
| 2408793 | 6/1979 | France ................................ 126/427 |
| 2428794 | 1/1980 | France ................................ 126/427 |
| 1425469 | 2/1976 | United Kingdom ........... 236/101 E |

*Primary Examiner*—Samuel Scott
*Assistant Examiner*—Noah Kamen
*Attorney, Agent, or Firm*—Laubscher, Philpitt & Laubscher

[57] ABSTRACT

A method and apparatus for obtaining water at a desired temperature from a generally vertical tank such as a water heater is disclosed, characterized in that water is drawn from the tank at a plurality of spaced vertical points where the water temperature has the desired temperature. The tank contains a quantity of water having a variable non-uniform temperature. A vertical pipe open at its upper and lower ends is centrally arranged within the tank, the lower end of the pipe extending through the bottom of the tank to define a water outlet. A plurality of normally closed, temperature responsive valves are connected with the pipe in vertically spaced relation. Each of the valves is operable when the water adjacent thereto has a predetermined temperature to deliver that water to the pipe, whereby the water at the outlet will have the predetermined temperature.

3 Claims, 4 Drawing Figures

WATER HEATING METHOD AND APPARATUS

BACKGROUND OF THE INVENTION

This invention relates to a method and apparatus for obtaining hot water at a predetermined temperature from a tank such as a hot water heater containing a quantity of water having a variable non-uniform temperature. The invention is particularly suitable for use with a vessel such as a water balloon or flask wherein water is heated by variable external heating energy applied through a heat exchanger in the lower portion of the vessel and by an auxiliary heating device in the vessel upper portion. The hot water may be used directly by occupants of a building as utility water or may be used to heat the building.

BRIEF DESCRIPTION OF THE PRIOR ART

Prior water heating tanks containing a quantity of water having a variable non-uniform temperature have generally included two outlet pipes for removing water from two vertically spaced locations within the tank as disclosed in the French Pat. No. 2,402,841. Specifically, one outlet pipe draws water from the top of the tank while the other outlet pipe draws water from the middle of the tank. This arrangement is based on the assumption that where cold water to be heated is introduced into the bottom of the tank, the water having the highest temperature will be at the top of the tank while the water having an average temperature will be located midway between the top and bottom of the tank. The two outlet pipes deliver water to a mixer outside of the tank where the water is mixed to provide outlet water having a desired temperature. The flow of water from the two outlet pipes is controlled to proportion of the mixture of water to produce an output of a desired temperature.

While the prior devices normally operate quite satisfactorily, they do possess certain inherent drawbacks. For example, the removal of water from the tank at two distant levels produces fluid currents within the tank which reduce the hot water yield of the device. Furthermore, the installation of two outlet pipes within the tank and the provision of a temperature controlled mixing device outside the tank greatly increases the complexity and cost of the prior devices.

The present invention was developed in order to overcome the above drawbacks of the prior devices by providing a method and apparatus for drawing water from a tank at selected regions where the water has a desired predetermined temperature. Thus, no modifying or mixing of the water at the exterior of the tank is required.

The invention, which is particularly applicable to a water heater, is thus an improvement over prior devices since water is drawn from within a tank at different levels over the entire height of the tank as opposed to from only two levels as is done in the conventional devices.

SUMMARY OF THE INVENTION

Accordingly, it is a primary object of the invention to provide a method and apparatus for removing water having a predetermined temperature from a generally vertical water heater tank containing a quantity of water having a variable, non-uniform temperature. A generally vertical outlet pipe is centrally arranged within the tank, the upper end of the pipe being arranged adjacent the top of the tank and containing an opening. The lower end of the pipe extends through the bottom of the tank and contains an outlet opening. A plurality of temperature-controlled valves are connected with the pipe in vertically spaced relation, each of the valves being operable to deliver water to the outlet pipe when the water adjacent the valve reaches the predetermined temperature. The water from the outlet opening thus has a constant predetermined temperature.

According to a more specific object of the invention, the water tank comprises a hot water heater, the tank containing a chamber and having a cold water inlet adjacent the bottom thereof for supplying cold water to the chamber. A first heater, such as a heat exchanger, is arranged in the bottom of the chamber to heat the water and a thermostatically controlled heater is arranged in the upper portion of the chamber to further heat the water.

It is a further object of the invention to provide an outlet pipe containing a plurality of vertically spaced openings for receiving the valves, respectively.

According to another object of the invention, the temperature-controlled valves are operable to admit water having a predetermined temperature into the pipe through the valve openings, and are further operable to restrict the flow of water downward through the pipe from above an opening.

BRIEF DESCRIPTION OF THE FIGURES

Other objects and advantages of the subject invention will become apparent from a study of the following specification when viewed in the light of the accompanying drawing, in which.

DETAILED DESCRIPTION

Figure 1:
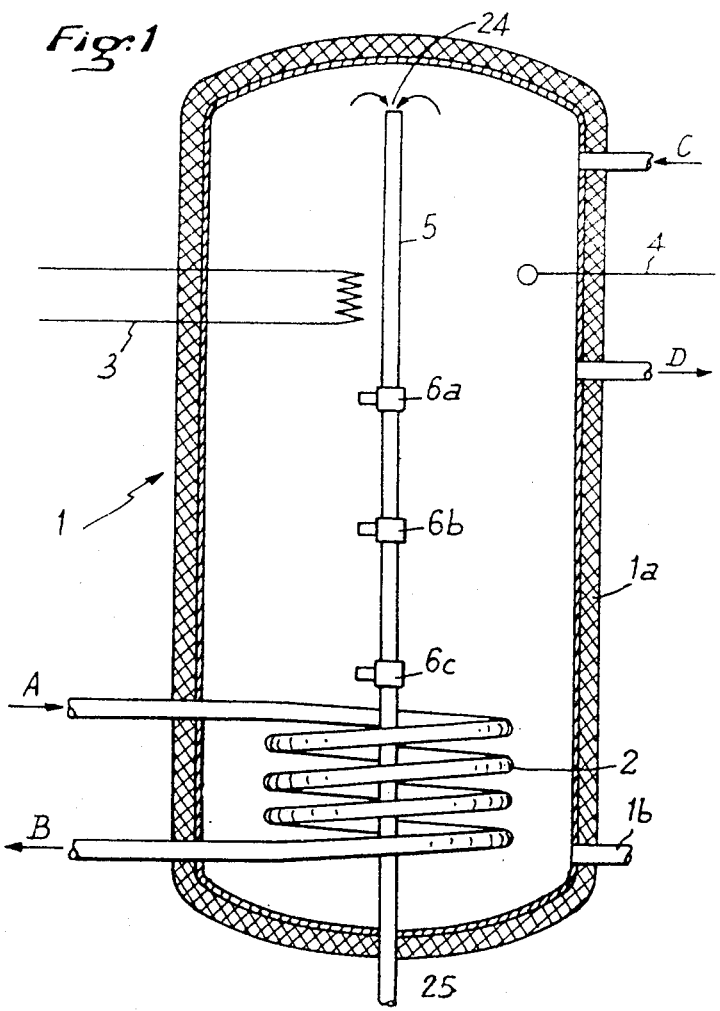
FIG. 1 is a sectional view of a hot water heater including apparatus for removing water at a predetermined temperature therefrom.

Referring first more particularly to FIG. 1, there is shown a hot water heating apparatus including a generally vertical flask or tank 1 containing a chamber. The wall of the tank includes a layer of insulation 1a and contains an inlet opening 1b for supplying cold water to the bottom of the chamber. A heat exchanger such as a coil 2 is arranged in the bottom portion of the chamber and contains an inlet opening A and an outlet opening B. The heat exchanger is adapted to introduce a variable external heating energy to the interior of the tank for heating the water therein. Thus, for example, where a solar heating system (not shown) is provided for heating a liquid, the liquid (which may have a variable temperature) is passed through the coil 2 to heat the water within the tank by heat exchange.

An auxiliary heater is arranged in the upper part of the chamber to provide support energy for further heating the water. The auxiliary heater may also comprise a coil (not shown) such as the coil 2 and would include an inlet C and an outlet D. Alternatively, the auxiliary heater comprises a resistance heater 3. A thermostat 4 is provided to control the operation of the auxiliary heater, whereby when the temperature of the water surrounding the thermostat, which is also arranged in the upper portion of the chamber, falls below a given temperature, the auxiliary heater is energized to further heat the water in the upper portion of the chamber. Owing to the two heaters, the water within the tank will have a variable, non-uniform temperature.

An outlet pipe 5 has a vertical axis and is centrally arranged within the chamber. The upper end of the pipe extends toward the top of the tank and contains an opening 24 through which heated water is introduced into the pipe. The lower end of the pipe passes through the bottom wall of the tank and contains an outlet opening. A plurality of vertically-spaced, temperature controlled valves 6a, 6b, 6c are connected with the outlet pipe for delivering water to the pipe when a predetermined temperature has been reached at the level of each valve as will be developed in greater detail below.

Figure 2:
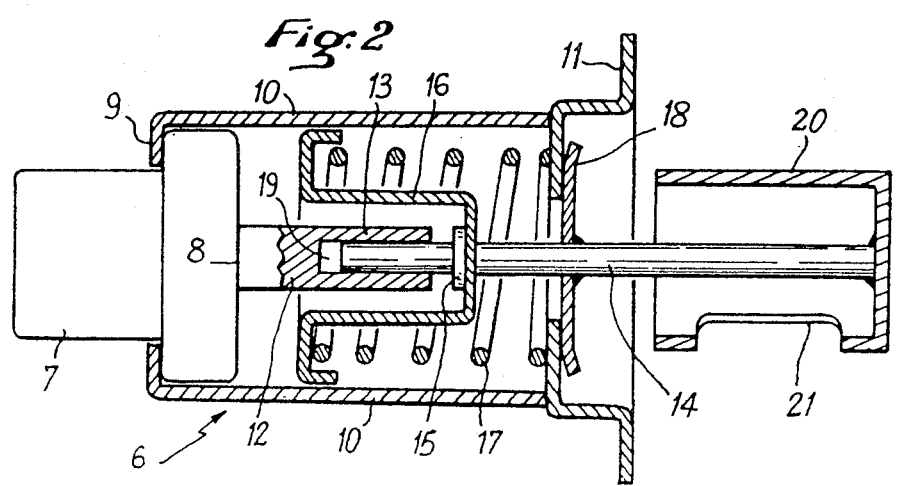
FIG. 2 is a detailed sectional view of a temperature-responsive valve.
Figure 3:
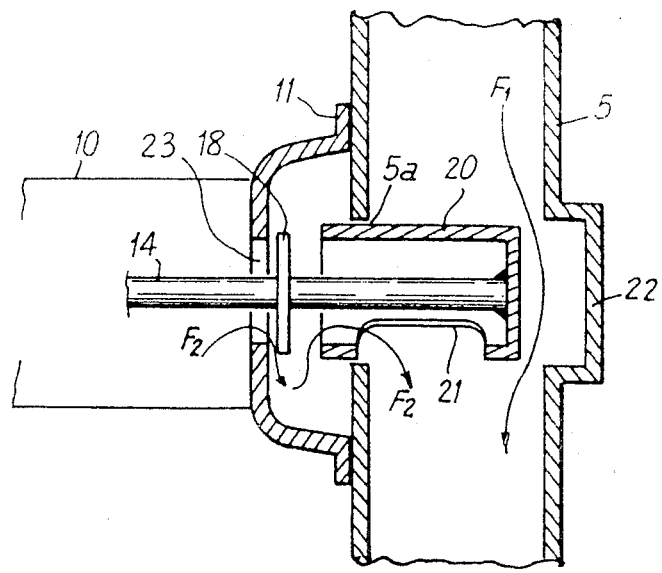
FIGS. 3 and 4 are sectional views of a temperature-responsive valve arranged within a lateral opening of the pipe in its partially open and fully open positions, respectively.
Figure 4:
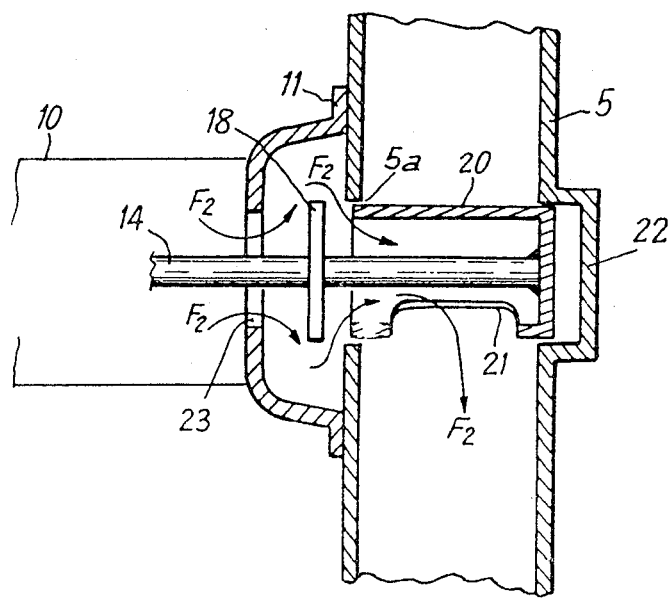

Referring now to FIG. 2, a temperature controlled valve 6 will be described in greater detail. The valve includes a temperature responsive device adapted to open the valve when the temperature reaches a predetermined value. In one embodiment, the temperature responsive device comprises a thermocouple or metallic strip. In the embodiment of FIG. 2, the temperature responsive device comprises a medium which expands in response to an increase in temperature such as a thermally responsive wax contained in a container 7 having an open end sealed by a membrane 8. Opposite the container is a collar member 11 which contains an opening 23 (FIGS. 3 and 4). An elongated U-shaped stirrup 10 is connected at one end with the collar member and includes at its other end bent edges 9 for grasping a ledge on the wax container. A first rod 12 is arranged within the stirrup and is connected at one end with the membrane 8 of the wax container. The other end of the rod 12 contains a bore hole 13 adapted to receive one end of a control rod 14 with a limited amount of leeway 19, the other end of the control rod extending through the collar opening. A cup-shaped return member 16 is connected with the control rod by a ring member 15 and surrounds the first rod 12. A return spring 17 is arranged between the cup-shaped member and the collar for biasing the cup-shaped member away from the collar member. The control rod further includes a disk-shaped member 18 on the side of the collar member opposite the spring for closing the collar opening 23 as will be set forth in greater detail below. On the remote end of the control rod is mounted a hollow cylindrical member 20 having a closed end connected with the end of the control rod. One wall of the cylinder member contains a longitudinal slot 21.

When the temperature of the wax of the valve member reaches a predetermined value, the wax expands against the membrane to displace the rod 12. Displacement of the rod 12 displaces the control rod 14 and cup-shaped return member 16 against the bias of the spring 17. Displacement of the control rod 14 displaces the disk-shaped member 18 and the cylinder member 20.

Operation of the temperature controlled valve member will be described with reference to FIGS. 3 and 4. The outlet pipe contains a lateral opening 5a and the collar member 11 of the valve is connected with the pipe so that the collar member opening 23 is aligned with the lateral pipe opening 5a and the axis of the control rod 14 is normal to the axis of the pipe. The cylindrical member of the valve extends into the pipe through the pipe opening when the valve is in its rest position wherein the spring biases the cup-shaped return member away from the collar, thereby to force the disk-shaped member 18 against the collar opening 23 to close the valve.

As the temperature of the water surrounding the wax container of the uppermost valve member 6a, for example, rises to a predetermined temperature, the wax expands to displace the control rod as set forth above to partially open the valve as shown in FIG. 3. In the partially open position, water from above the valve (such as that from the opening 24) is allowed to pass downwardly through the pipe 5 around the cylinder member 20 owing to the external bulge 22 in the pipe. This flow of water is designated by the arrow $F_1$. Furthermore, water having the predetermined temperature is drawn into the pipe 5 through the stirrup 10, the collar opening 23, the open end of the cylinder member 20, and the longitudinal opening 21 as shown by the arrows $F_2$.

As the temperature of the water surrounding the valve 6a continues to rise, the valve attains its fully open position shown in FIG. 4. The cylindrical member 20 extends to the bulge 22 thereby effectively blocking the flow of water $F_1$ from above the valve whereby all of the water drawn into the pipe will be in a flow $F_2$ through the pipe.

It is evident that water may also partially or completely enter the pipe 5 through the valves 6b and 6c depending on the temperature of the water at their respective heights within the tank.

Owing to the construction of the tank containing a single outlet pipe having a plurality of temperature responsive valve members connected in vertically-spaced relation therewith, the most efficient use of the heat exchanger and auxiliary heater may be attained while the valves are operable to deliver only water having a predetermined consistent temperature to the outlet opening.

The device according to the invention has numerous applications. For example, the apparatus may be applied to any heating system in which the heat output decreases with a temperature rise such as heating systems using solar energy and also thermodynamic boilers such as fast water heaters having heat exchange by water vapor condensation contained in combustion products.

The method and apparatus according to the present invention provides a number of major advantages. Firstly, water is taken from the upper portion of the tank only when absolutely necessary (i.e., when the temperature of the water heated by the heat exchanger coil 2 in the lower portion of the tank is below the predetermined temperature). This reduces the operation of the auxiliary heater and thus helps to conserve energy. Secondly, the apparatus allows water to be drawn simultaneously from different levels within the tank which means that the distribution of water temperature within the tank is slightly modified which diminishes water circulation within the tank. Finally, only a single outlet pipe is required to draw the water at a plurality of levels, thereby simplifying construction of a water heater tank and reducing its cost.

While in accordance with the provisions of the Patent Statutes, the preferred forms and embodiments of the invention have been illustrated and described, it will be apparent to those skilled in the art that various changes and modifications may be made without deviating from the inventive concepts set forth above.

What is claimed is:

1. Apparatus for removing water having a pedetermined temperature from a generally vertical water heater tank containing a quantity of water having a variable non-uniform temperature, comprising
   (a) an outlet pipe (5) centrally arranged within the tank and having a generally vertical axis, the upper end of said pipe being arranged adjacent the top of the tank and containing an opening (24) and the lower end of said pipe extending through the bottom of the tank and containing an outlet opening (25), said pipe containing a plurality of vertically spaced lateral openings (5a); and
   (b) a plurality of temperature-controlled valve means (6) arranged within said plurality of lateral openings, respectively, for delivering water to said pipe when the water adjacent said valve means reaches the predetermined temperature, each of said valve means including
      (1) a collar member (11) connected with said pipe and surrounding one of said lateral openings, said collar member containing an opening (23) aligned with said lateral pipe opening;
      (2) a control rod (14) having an axis normal to said pipe axis and extending through said collar member and lateral pipe openings;
      (3) a disk-shaped plate member (18) connected with said control rod, said plate member being operable to close said collar member opening;
      (4) a hollow cylindrical member (20) having a closed end connected with the end of said control rod extending through said lateral pipe opening into said pipe, the lower wall portion of said cylindrical member containing a slot (21); and
      (5) temperature-responsive means for reciprocating said control rod between normally closed, partially open, and fully open positions, respectively, whereby when the temperature of the water adjacent a lateral pipe opening is below the predetermined temperature, said control rod is in its closed position wherein said plate member closes said collar member opening to prevent the flow of water into said pipe through said lateral pipe opening wherein said cylindrical member extends partially into said pipe, thereby to afford passage of water downwardly through said pipe around said cylindrical member, and when the temperature of the water adjacent said lateral pipe opening reaches the predetermined temperature, said control rod is initially displaced to its partially open position wherein said plate member is partially spaced from said collar member opening to allow water to flow into said pipe through said lateral pipe opening and said slot and said cylindrical member extends further into said pipe to afford passage of water downwardly through said pipe around said cylindrical member, and when the temperature of the water adjacent said lateral pipe opening exceeds the predetermined temperature, said control rod is further displaced to its fully open position wherein said plate member is further spaced from said collar opening to allow water to flow into said pipe through said lateral pipe opening and said slot and said cylindrical member extends completely into said pipe to prevent passage of water downwardly through said pipe beyond said cylindrical member.

2. Apparatus as defined in claim 1, wherein said temperature-responsive means comprises an expansible wax.

3. Apparatus as defined in claim 1, wherein said temperature-responsive means comprises metallic strip means.